(12) United States Patent
Wagner et al.

(10) Patent No.: US 11,966,033 B2
(45) Date of Patent: *Apr. 23, 2024

(54) SYSTEM AND METHOD FOR GENERATING WHITE LIGHT FOR PROJECTORS

(71) Applicants: Clark Wagner, Hacienda Heights, CA (US); Thomas Hardenburger, Laverne, CA (US)

(72) Inventors: Clark Wagner, Hacienda Heights, CA (US); Thomas Hardenburger, Laverne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,224

(22) Filed: Aug. 2, 2022

(65) Prior Publication Data

US 2022/0373776 A1 Nov. 24, 2022

Related U.S. Application Data

(63) Continuation of application No. 16/510,367, filed on Jul. 12, 2019, now Pat. No. 11,402,617.

(60) Provisional application No. 62/697,051, filed on Jul. 12, 2018.

(51) Int. Cl.
| | |
|---|---|
| *G02B 19/00* | (2006.01) |
| *G02B 17/06* | (2006.01) |
| *G02B 27/09* | (2006.01) |
| *G02B 27/30* | (2006.01) |

(52) U.S. Cl.
CPC ......... *G02B 19/0057* (2013.01); *G02B 17/06* (2013.01); *G02B 27/0922* (2013.01); *G02B 27/0955* (2013.01); *G02B 27/30* (2013.01)

(58) Field of Classification Search
CPC ............... G02B 19/0057; G02B 17/06; G02B 27/0955; G02B 27/30
See application file for complete search history.

(56) References Cited

U.S. PATENT DOCUMENTS

| | | | | |
|---|---|---|---|---|
| 2013/0088471 A1* | 4/2013 | Kitano | ............... | G02B 27/1026 345/208 |
| 2015/0029472 A1* | 1/2015 | Lin | ...................... | H04N 9/3144 353/56 |
| 2016/0188124 A1* | 6/2016 | Ono | ..................... | H04N 9/3114 345/156 |
| 2016/0274448 A1* | 9/2016 | Ishizu | .................... | G03B 33/08 |
| 2017/0347072 A1* | 11/2017 | Lawes | .................. | H04N 9/3147 |

* cited by examiner

*Primary Examiner* — Christopher Stanford
*Assistant Examiner* — Journey F Sumlar
(74) *Attorney, Agent, or Firm* — Cislo & Thomas, LLP

(57) ABSTRACT

A system and method of generating white light for a projection system in a compact form factor using laser diodes, a reflection system, and a phosphor target. Light emitted from the laser diodes can be directed towards a region of the phosphor target, where the phosphor target is excited and emits light in a desired spectrum in all directions. Some emitted light is collected by a collection lens. The emitted light collected by the collection lens can be combined with light from the original laser diodes to create white light for use in the projection system. Light emitted in a direction away from the collection lens can be redirected to the collection lens by the reflection system that employs a curved reflector on one side of the phosphor target and a flat reflector on the opposite side of the phosphor target.

20 Claims, 7 Drawing Sheets

SYSTEM AND METHOD FOR GENERATING WHITE LIGHT FOR PROJECTORS

CROSS-REFERENCES TO RELATED APPLICATIONS

This application is a continuation application of U.S. patent Ser. No. 16/510,367, filed Jul. 12, 2019, which claims the benefit of U.S. Provisional Application No. 62/697,051, filed Jul. 12, 2018, which application is incorporated herein in its entirety by this reference thereto.

BACKGROUND OF THE INVENTION

Field of the Invention

This invention relates to methods and systems for improving white light generation for projector systems.

Description of the Related Art

In general, laser phosphor projectors direct blue light emitted from blue laser diodes through a phosphor wheel to generate broad band light in the yellow-green range. This broad band light is combined with blue light to generate white light. The white light is then projected downstream to a projector image device for use to generate a variety of colors to project color images on a screen. Current projector systems, however, tend to be inefficient as much of the light that is generated tends to be wasted.

Therefore, there is a need for a projection system that is more efficient in generating white light.

SUMMARY OF THE INVENTION

The present invention is a system and method for improving the capabilities of a producing white light for a projection system. The configuration of the present invention may also reduce the cost and complexity of systems to collect and concentrate light from laser diodes by mounting an array of blue laser diodes on a flat plate, directing the blue light rays emitted from the blue laser diodes towards a concave reflector, which then concentrates the blue light rays back towards the flat plate into a hole where the blue light rays are collimated into a beam of blue light. However, the beam of blue light is not necessarily collimated. The beam of blue light is then directed towards a phosphor target, which when excited by the blue light emits a broad band light in the yellow-green range. Broad band light rays that are emitted from a collection region on the phosphor target are then collected by a collection lens where the broad band light rays are collimated into a broad band light beam. However, the broad band light beam is not necessarily collimated. The broad band light beam is then combined with blue light to generate white light, which can be used by the projector imaging device to create a variety of colored images.

In some embodiments, the beam of blue light can be split to generate two beams of blue light, one of which is used to excite the phosphor target, and one of which is used to combine with the broad band light to generate white light.

In some embodiments, rather than splitting the beam of blue light into two beams of blue light, a second set of blue laser diodes can be positioned specifically to generate a second beam of blue light to combine with the broad band light to generate the white light.

In some embodiments, a set of red laser diodes and/or a set of green laser diodes can be used to emit red rays of light and/or green rays of light to combine with the blue light to generate white light.

In some embodiments, to improve the efficiency of capturing the broad band light for use in generating white light, the phosphor target can comprise reflective material on one side of the target so as to prevent light from passing through the phosphor target, and increase the probability that the emitted broad band light is reflected back towards a collectable zone.

In some embodiments, to further improve the efficiency of capturing the emitted broad band light, a recycling optic may be positioned adjacent to the phosphor target. The recycling optic is configured and positioned in a manner that allows broad band light emitted from the phosphor target that is not directed towards a collection region to be reflected by the recycling optic to increase the probability that the emitted light will eventually escape the recycling optic and enter a collectable zone where the broad band light rays can be collimated and combined with blue light to create white light.

In some embodiments, the system can utilize both the recycling optic and the reflector on the phosphor target to further improve the probability that an emitted broad band light will eventually escape the recycling optic and enter the collectable zone.

DESCRIPTION OF THE PREFERRED EMBODIMENTS

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention. Also, the drawings are not necessarily drawn to scale, but rather are provided in a manner to help understand the description of the invention described herein.

The present invention is a laser projection system 100 with improved capabilities in generating white light in a compact package. Using the systems and methods described herein, a projector system is capable of increasing the scope of available spectral color that can be generated. For example, typical projectors are only capable of generating a portion of the colors shown on the standard CIE xy chromaticity diagram, which is a horse-shoe shaped curve displaying the color spectrum. With the present invention, the portion of the colors on the standard CIE xy chromaticity diagram is increased.

Furthermore, digital cinema projectors employing xenon lamps are designed to produce a DCI-P3 color space. The use case of the present system can replace xenon lamps in these projectors and produce a DCI-P3 color space. With some sacrifice of light output the system is capable of producing a color gamut larger than the DCI-P3 gamut. With the addition of red and green lasers to supplement the light emitted from the phosphor the color gamut could be expanded to cover a range 25% larger than DCI-P3. Nonetheless, the system of the present invention is capable of matching, and exceeding, the output of a 4 kW Xenon lamp when producing a DCI-P3 color gamut from a digital cinema projector.

Figure 1:
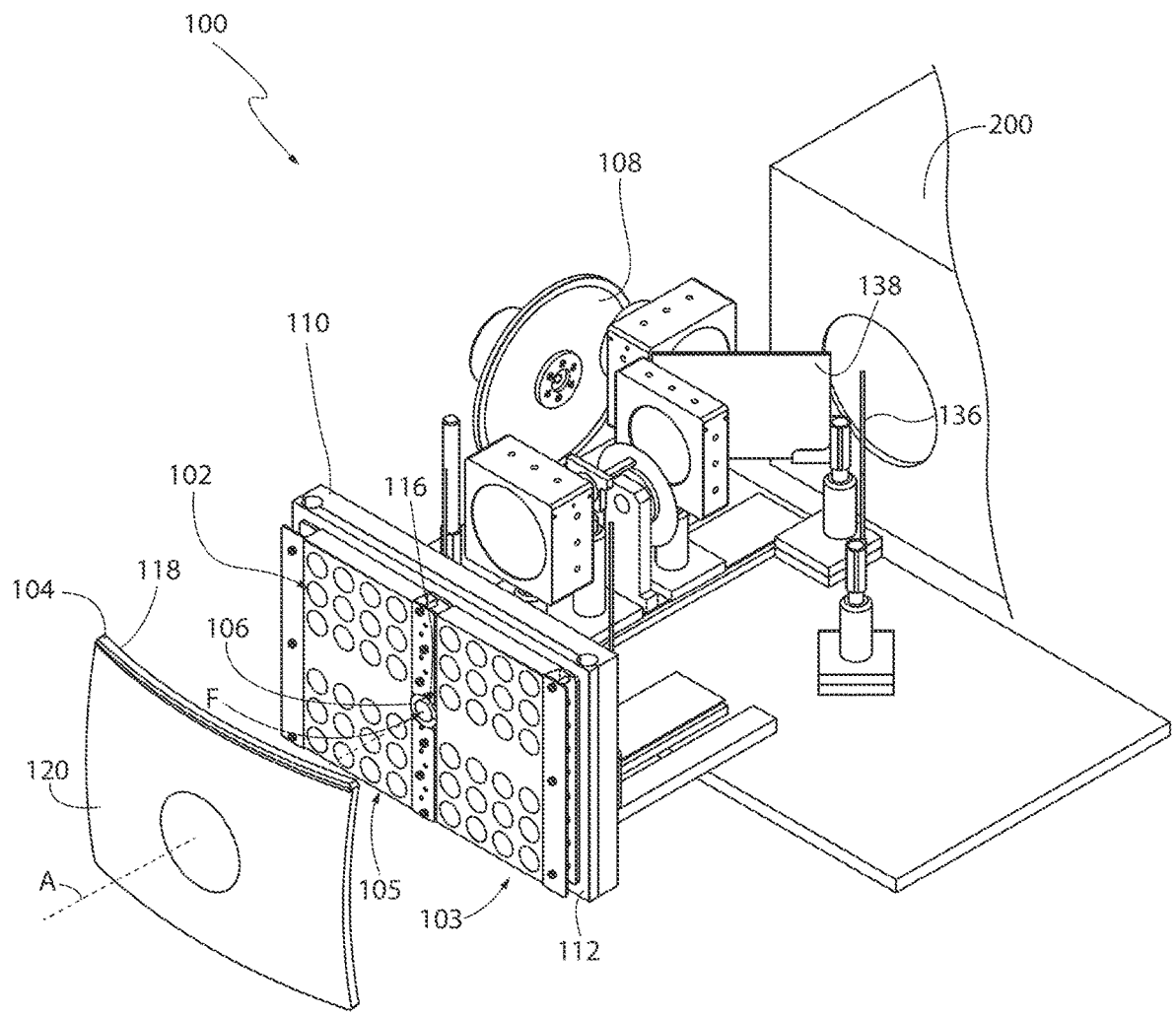
FIG. 1 is a perspective view of an embodiment of the present invention with structural framing removed for clarity.
Figure 2:
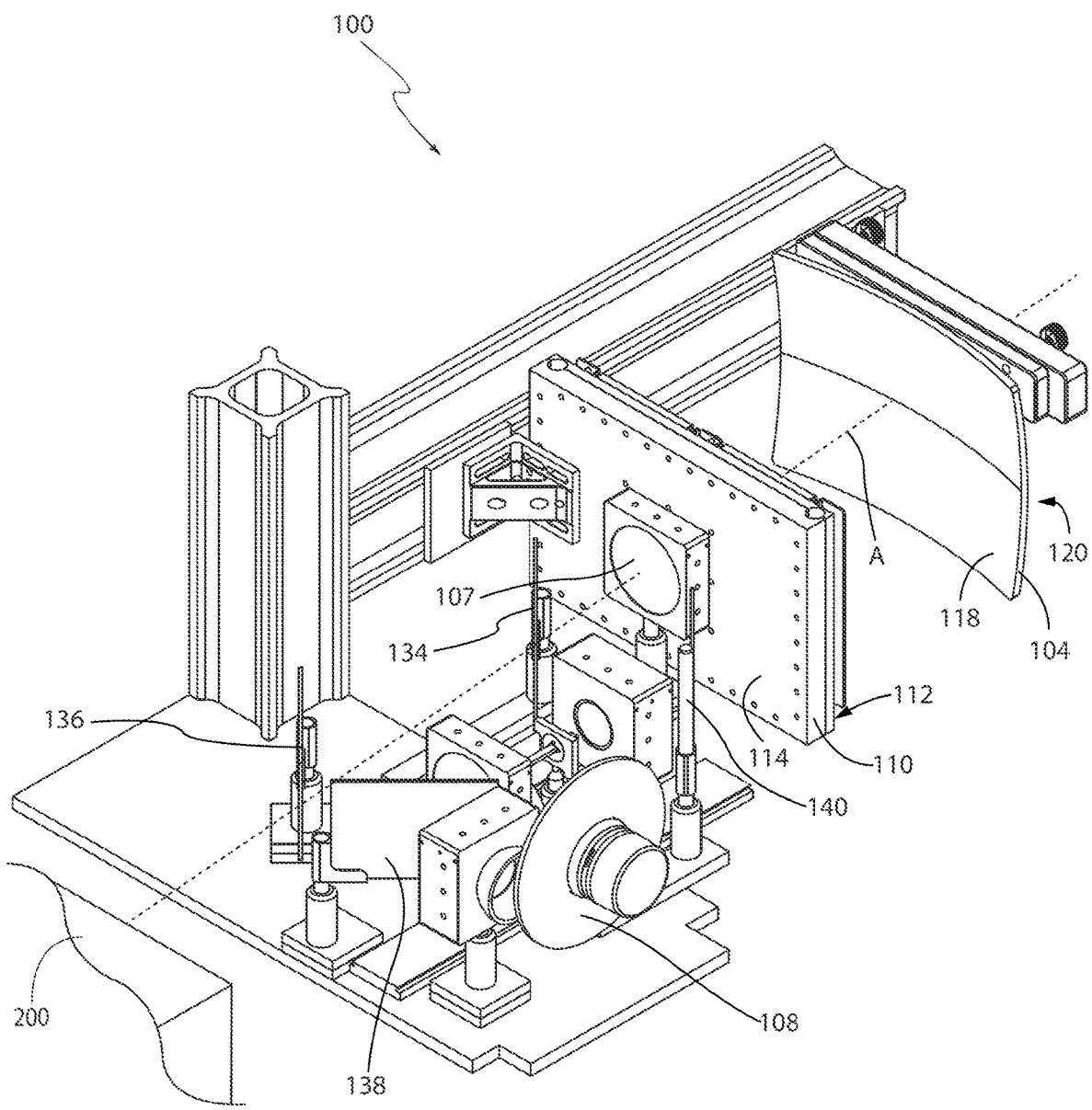
FIG. 2 is a perspective view of the embodiment shown in FIG. 1, but from the opposite side.
Figure 3:
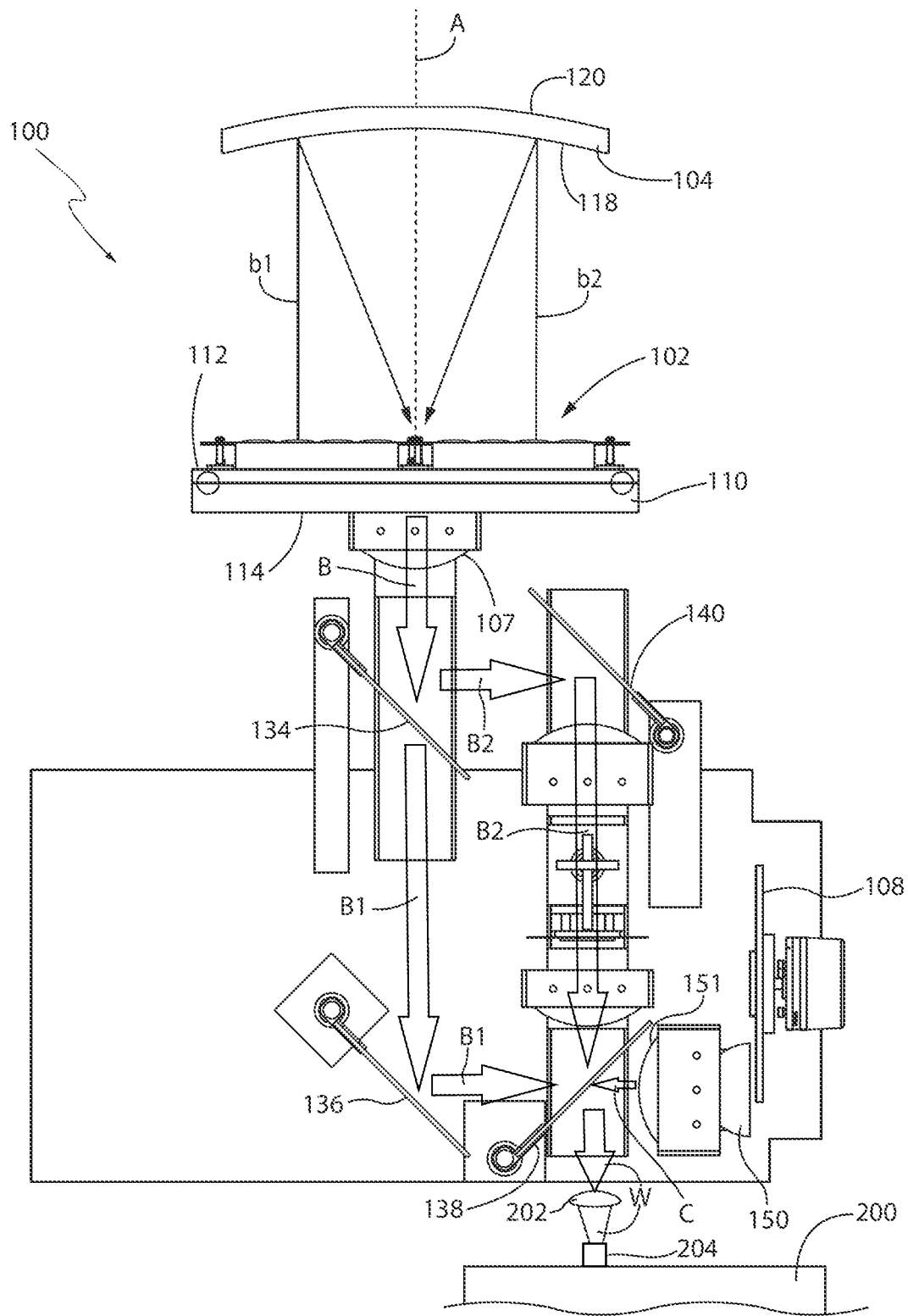
FIG. 3 is a top view of the embodiment shown in FIG. 1.

With reference to FIGS. 1-3, in some embodiments, the laser projection system 100 improves the capabilities of generating white light W by using blue light rays b1, b2 generated from an array of blue laser diodes 102, reflecting the blue light rays b1, b2 off of a concave reflector 104, directing the reflected blue light rays b1, b2 through a directing lens 106 to generate a beam of blue light B, and eventually directing the beam of blue light B towards a projector imaging device 200, wherein the beam of blue light B combines with a beam of light of another color to create white light W prior to exiting towards the projector imaging device 200. A variety of optical devices, such as lenses, mirrors, partially reflective mirrors, and the like, can be used to direct the beam of blue light B in the desired path so that the beam of blue light B and the beam of light of another color can combine and be emitted as white light W towards the projector imaging device 200. In some embodiments, the white light W can pass through a lens 202, such as a focusing lens, that focuses the beam to an integrating rod 204 as it enters the projector imaging device 200.

The optical devices can be a single element, such as a single lens, or multi-element devices. For example, any of the lenses described herein can be a doublet (two separate lenses inside a holder), a triplet (three separate lenses), etc. In the preferred embodiment, the beam of blue light B is absorbed by a phosphor target 108, and the phosphor target 108 emits a broad band light C to combine with blue light to form the white light W. In some embodiments, the beam of blue light B is combined with a beam of red light and/or a beam of green light generated by a plurality of red laser diodes and/or a plurality of green laser diodes, respectively.

Blue light rays b1, b2 can be generated from a variety of different light sources. In the preferred embodiment, the blue light rays b1, b2 are generated from a plurality of blue laser diodes 102. The blue light rays b1, b2 can be emitted in the wavelength range of approximately 400 nm to approximately 495 nm. Preferably, the blue light rays b1, b2 have a wavelength of approximately 440 nm to approximately 475 nm. Most preferably, the blue light has a wavelength of approximately 455 nm to approximately 465 nm.

The plurality of blue laser diodes 102 can be arranged in a planar, two-dimensional array by mounting the plurality of blue laser diodes 102 on a plate 110 that is generally flat. The plate 110 comprises a first side 112, a second side 114 opposite the first side 112, and a hole 116 therethrough from the first side 112 to the second side 114. The plurality of blue laser diodes 102 can be mounted on the first side 112 of the plate 110. In the preferred embodiment, the plurality of blue laser diodes 102 covers the full extent of the plate 110, except for the hole 116. Thus, substantially the whole surface of the first side 112 of the plate 110 can be covered by laser diodes.

The plate 110 also functions as a cold plate or a heat sink to facilitate dissipation of the heat generated by the laser diodes 102. As such, in some embodiments, the whole surface of the plate 110 may not be covered. In other words, there may be portions of the plate 110 that are not covered by diodes 102 so as to improve heat dissipation.

In the preferred embodiment, the system 100 comprises a concave reflector 104, rather than a plurality of generally flat mirrors, in which each would have to be mounted to receive a single ray of light and redirected individually. The concave reflector 104 can have a spherical shape, a parabolic shape, a hyperbolic shape, or the like; and can be a mirror, a reflective surface, a surface with a reflective coating, or the like. As such, the concave reflector 104 defines an axis A and a focal point F, and has a concave side 118 and a convex side 120. The concave reflector 104 can be positioned to receive light rays b1, b2 emitted from the plurality of blue laser diodes 102 that are arranged in a flat, two-dimensional array, and redirect the light rays b1, b2 back towards the focal point F. In other words, the concave side 118 of the concave reflector 104 would face the first side 112 of the plate 110 containing the blue laser diodes 102 that would emit light rays b1, b2 towards the concave side 118 of the concave reflector 104. Thus, the concave reflector 104 can be placed in a plane parallel with the plate 110 upon which the array of laser diodes 102 is mounted. Light rays b1, b2 that are emitted parallel to the axis A of the concave reflector 104 reflect off the concave reflector 104 and are directed toward the focal point F of the concave reflector 104 as shown in FIG. 3. The light rays emitted from the laser diodes 102 are, therefore, focused by the concave reflector 104 to the focal point F of the concave reflector 104.

In the preferred embodiment, the plate 110 can be configured with a through-hole 116 at the location of the focal point F so that the light can pass through the hole 116 for further use in the projection system 100. In other words, to allow the focused light to pass through the plate 110 to the opposite side, the hole 116 of the plate 110 is positioned at the approximate location of the focal point F of the concave reflector 104. Preferably, the hole 116 is provided at approximately the center of the plate 110. A directing lens 106 can be placed at the hole 116 to diverge the light rays converging at the focal point F. Preferably, the lens is positioned adjacent to the first side 112 of the plate 110 directly in front of the hole 116 or in the hole 116 so that the converging light rays b1, b2 reflected off of the concave reflector 104 are diverged to pass through the hole 116. On the opposite side of the plate 110 can be a beam forming lens 107. The beam forming lens 107 can collimate the light rays b1, b2 into a single beam of light B parallel to the axis A of the concave reflector 104.

The directing lens 106 can be a collimating lens. However, the light rays b1, b2 need not necessarily be collimated. In some embodiments, the directing lens 106 can be a diverging plano-concave lens mounted in or adjacent to the hole 116 of the plate 110. The directing lens 106 may be placed such that the light rays b1, b2 encounter it prior to the convergence point of the light rays b1, b2 (or focal point of the parabola). The directing lens 106 thereby can accomplish several things. It may introduce some divergence to the individual rays reducing hot spots and improving pump uniformity on a phosphor target 108 in a blue pumped phosphor system. It can also decrease the convergence angle of the light rays b1, b2 allowing for a longer focal length lens system to be employed for collimation of the rays into a beam. Finally, it may shift the focal point F of the concave reflector 104 to partially inside the plate 110. This may avoid or reduce any loss of light due to clipping the sides of the hole 116 and may therefore avoid the need for a larger hole, which would reduce the amount of surface area on the plate 110 available to cool the blue laser diodes 102. Nonetheless, in some embodiments, with the appropriate size of hole 116 and thickness of the plate 110, the directing lens 106 could be placed behind or downstream of the plate 110.

On the second side 114 of the plate 110 (downstream of the blue laser diodes 102) opposite the concave reflector 104 there may be mounted a series of optical devices, such as mirrors, partially reflective mirrors, beam splitters, beam forming lenses, and the like, to guide light beam in a particular direction, or lenses through which the light can be dispersed, focused, and/or collimated into a beam of parallel light rays, or the like, for use in the balance of the projection system 100 as discussed further below.

Figure 4:
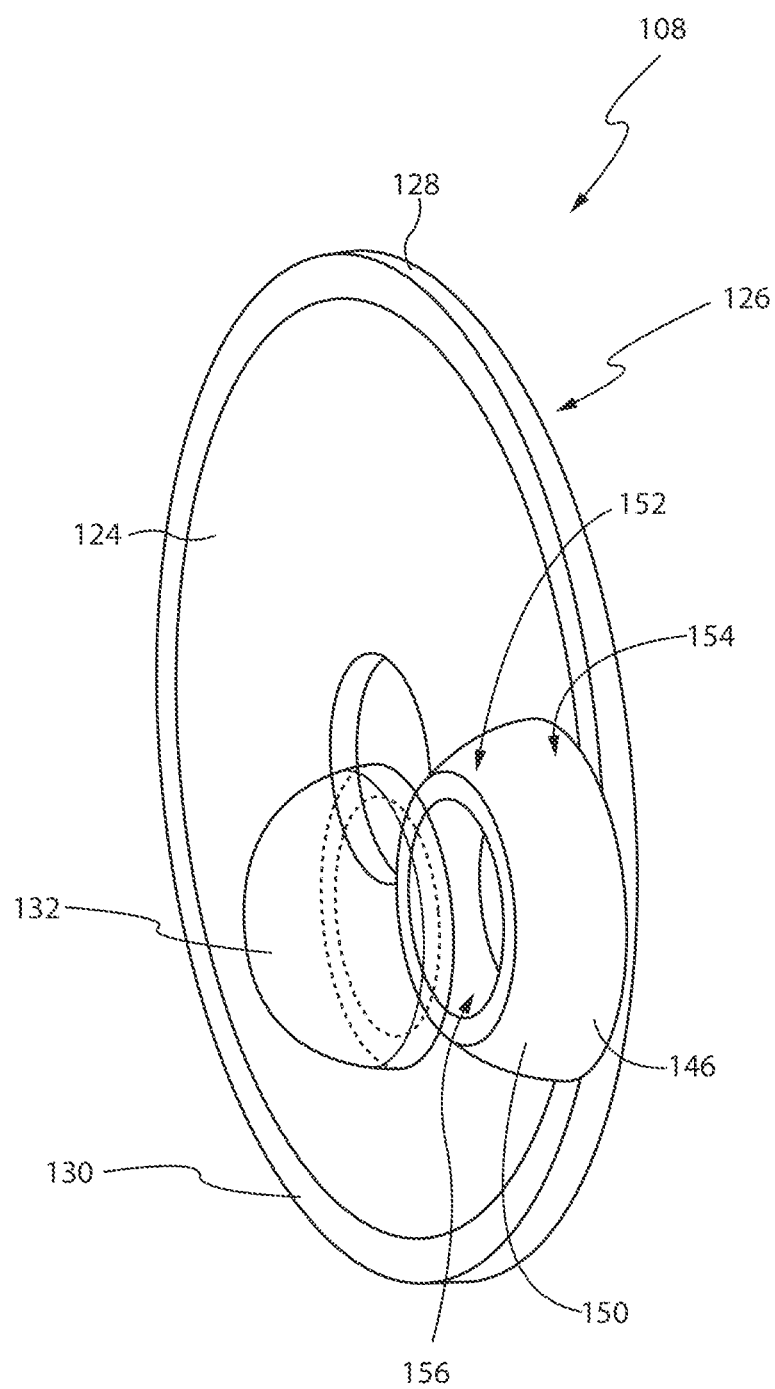
FIG. 4 is a close-up view of an embodiment of a phosphor target and a recycling optic.

With reference to FIGS. 3 and 4, the optical devices direct the blue light beam B onto a phosphor target 108. The blue light beam B excites the phosphor target 108 at a collection region 162, which emits broad band light rays c1, c2 with a peak in the yellow or green range. By way of example only, the broad band light can have wavelengths ranging from approximately 475 nm to approximately 700 nm. Preferably, the broad band light has wavelengths ranging from approximately 500 nm to approximately 660 nm. Most preferably, the broad band light has wavelengths ranging from approximately 540 nm to approximately 570 nm.

Figure 5:
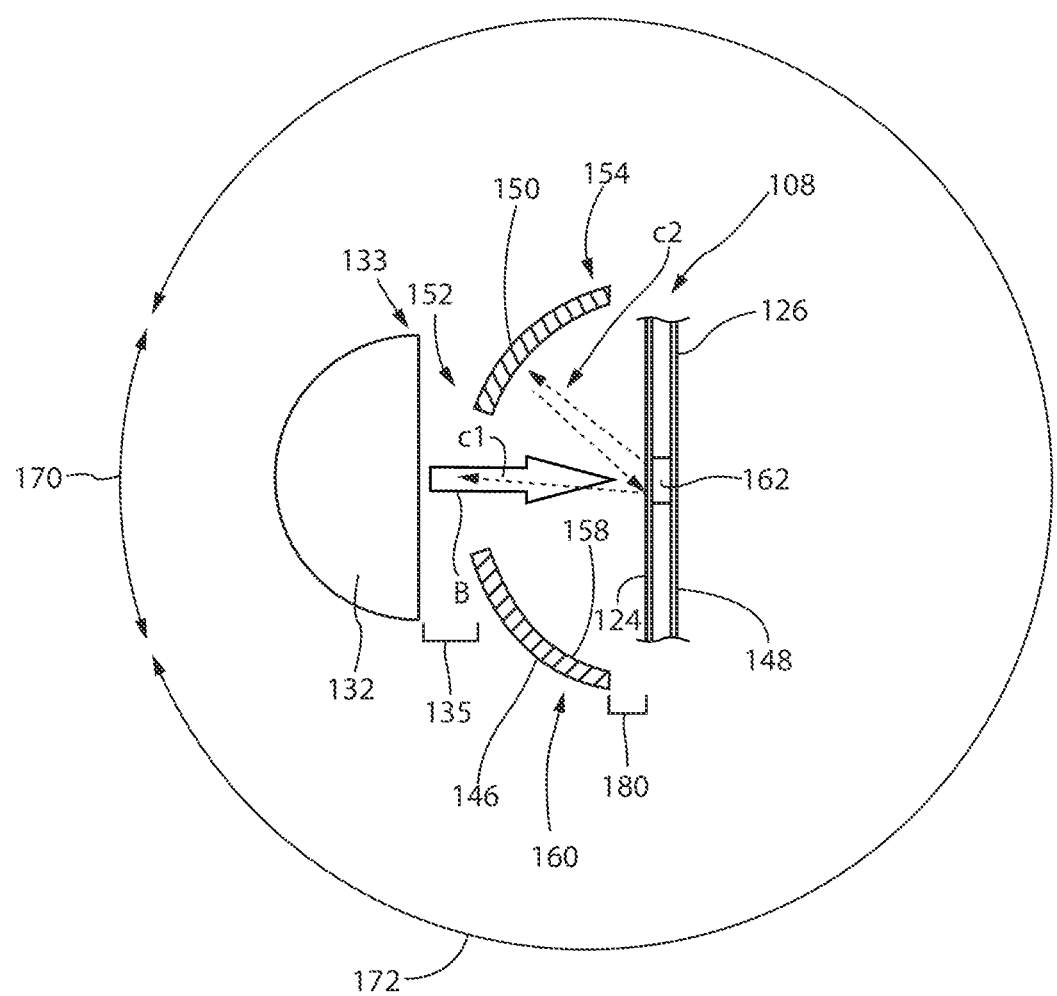
FIG. 5 is a side view of a portion of the phosphor target and the recycling optic showing the reflection of light.

The broad band light rays c1, c2 emitted from the phosphor target 108 are scattered in all direction. As such, the broad band light rays c1, c2 can enter a collectable zone 170 and a non-collectable zone 172 as shown in FIG. 5. The collectable zone 170 is the area at which broad band light rays c1 emitted from the phosphor target 108 are captured by a collection lens 132. The collection lens 132 can then collimate the emitted broad band light rays c1 into a broad band light beam C and direct the broad band light beam C back towards a partially reflective mirror 138. The collection lens 132 can be one element in a triplet assembly that collimates light. In some embodiments, the broad band light rays c1 captured by the collection lens 132 may be passed through a beam forming lens 151 to form the broad band light beam C that is passed to the partially reflective mirror 138. In some embodiments, the broad band light rays c1 need not be collimated as the light rays c1 from the collection zone can be focused to a converging or diverging beam to match the input characteristics of the projection system 200.

The partially reflective mirror is an optical device configured (e.g., treated, coated, combined, made up of material) to allow light of a desired wavelength to pass while reflecting light of another wavelength. For example, the partially reflective mirror 138 can be a dichroic mirror. The partially reflective mirror 138 then reflects the broad band light beam C towards the downstream projector imaging device 200. In doing so, the partially reflective mirror 138 also allows a beam of blue light B2 to pass through the partially reflective mirror 138 in a direction coincident with the broad band light beam C reflected off of the partially reflective mirror 138. Thus, the broad band light beam C and the blue light beam B2 combine to form the white light W which is directed towards the projector imaging device 200. In some embodiments, the white light W can pass through a lens 202, such as a focusing lens, that focuses the beam to an integrating rod 204 as it enters the projector imaging device 200. The partially reflective mirror 138 can be configured to reflect green and red light as desired.

With reference to FIGS. 4 and 5, in the preferred embodiment, the phosphor target 108 is a rotatable phosphor wheel having a first side 124 and a second side 126 defining a circular perimeter 128, wherein the rotatable phosphor target 108 has a phosphor region 130 on the first side 124 of the phosphor target 108 along the perimeter 128. Preferably, the phosphor region 130 comprises cerium-doped yttrium aluminum garnet (YAG) that is excited by the beam of blue light and emit a broad band light with a peak in a yellow-green range. The phosphor can be a single crystal or it can be a polycrystalline structure. In some embodiments, the phosphor can be a cerium doped YAG power in a binder, such as a silicone matrix. In one embodiment, the phosphor region 130 may be deposited as a circular stripe on the wheel along the perimeter on the first side 124. The wheel may then spin to change the portion of the phosphor region 130 that is being pumped and reduce heat effects in the phosphor region 130. Spinning of the phosphor target 108 also decreases localized heating effects due to speckle in the laser pump beam.

The optical devices used to direct the path of the lights can be mirrors, partially reflective mirrors, beam splitters, and the like, that are configured (e.g., treated, coated, combined, made up of material) to produce the desired function (reflect light, redirect light, allow light to pass, etc.). These optical devices can be positioned in a variety of arrangements to guide the beam of blue light B to the phosphor target 108, guide the broad band light C out from the phosphor target 108 towards the collectable zone 170, and to combine the broad band light C from the collectable zone 170 with beam of blue light B to create white light W that is then directed towards the projector imaging device 200. In some embodiments, the white light W can pass through a lens 202, such as a focusing lens, that focuses the beam to an integrating rod 204 as it enters the projector imaging device 200.

By way of example only, with reference to FIGS. 1-3, in some embodiments, a beam splitter 134 can be positioned downstream of the plate 110 in the path of the beam of blue light B collimated at the hole 116 of the plate 110 to split the beam of parallel light rays into a first beam of blue light B1 and a second beam of blue light B2. The beams of blue light B1, B1 need not necessarily be collimated. The beam splitter 134 is positioned so as to allow some of the blue light beam (the first beam of blue light B1) to pass through the beam splitter 134 along a first path while reflecting some of the blue light beam (the second beam of blue light B2) in a path different from the first beam of blue light B1. For example, the second beam of blue light B2 may be perpendicular to the first beam of blue light B1.

A first reflector 136 may be positioned downstream and in the path of the first beam of blue light B1 to direct the first beam of blue light B1 towards the phosphor target 108. For example, the first reflector 136 can reflect the first beam of blue light B1 in a direction perpendicular to the original beam of blue light B. In between the first reflector 136 and the phosphor target 108 may be a partially reflective mirror 138 that allows the first beam of blue light B1 to pass through the partially reflective mirror 138 to hit the phosphor target 108. When the first beam of blue light B1 hits the phosphor target 108, the broad band light rays c1, c2 are emitted from the phosphor target 108, some of which are directed towards the collectable zone 170.

In the preferred embodiment, the collectable zone 170 can be in the path of the first beam of blue light B1. The collectable zone 170 has the collection lens 132 to direct the broad band light rays c1 as a broad band light beam C heading in a direction towards the partially reflective mirror 138. The partially reflective mirror 138 reflects the broad band light beam C in a new direction (for example, perpendicular to the original direction of the collimated broad band light C) towards the projector imaging device 200. In some embodiments, the collection lens 132 can be a triplet assembly configured to collimate the broad band light beam C. In some embodiments, the broad band light beam C is not collimated. Rather, light from the collection zone could be focused to a converging or diverging beam to match the input characteristics of the projection system.

In some embodiments, there may be a second reflector 140 downstream and in the path of the second beam of blue light B2 to reflect the second beam of blue light B2 towards the partially reflective mirror 138. For example, the second beam of blue light B2 can be reflected in a direction perpendicular to the original direction of the second beam of blue light B2, which may now be parallel to the original beam of blue light B1. The second beam of blue light B2 passes through the partially reflective mirror 138 and is in line with and in the same direction as the beam of broad band light C that has been reflected off of the partially reflective mirror 138 so as to combine with the broad band light beam C to create white light W that is sent through a lens 202 and to the projector imaging device 200. In some embodiments, the projector imaging device 200 can have an integrating rod 204 to receive the white light W focused through lens 202. Therefore, a compact configuration is created for creating white light W.

Figure 6:
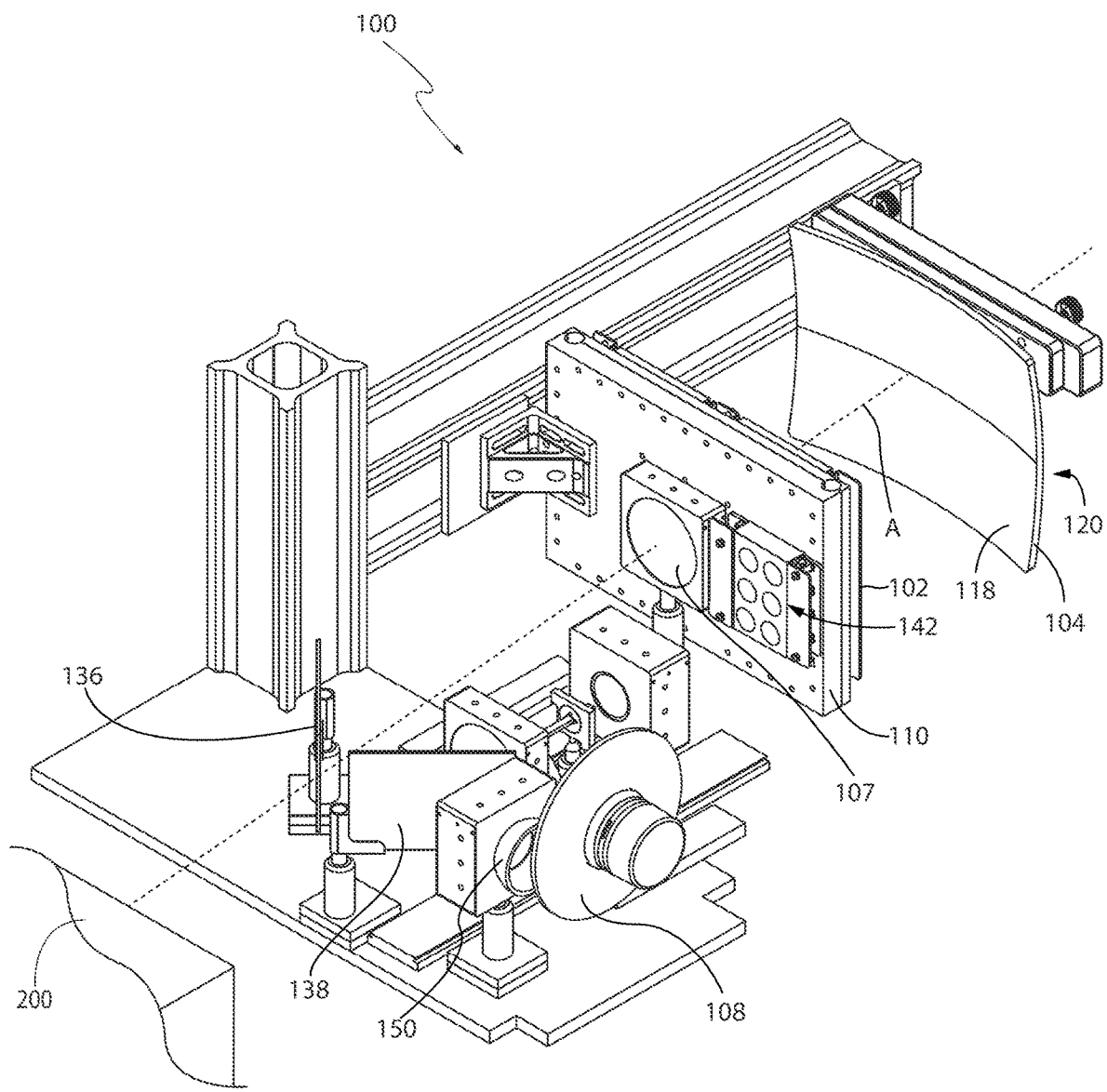
FIG. 6 is a perspective view of another embodiment of the present invention.
Figure 7:
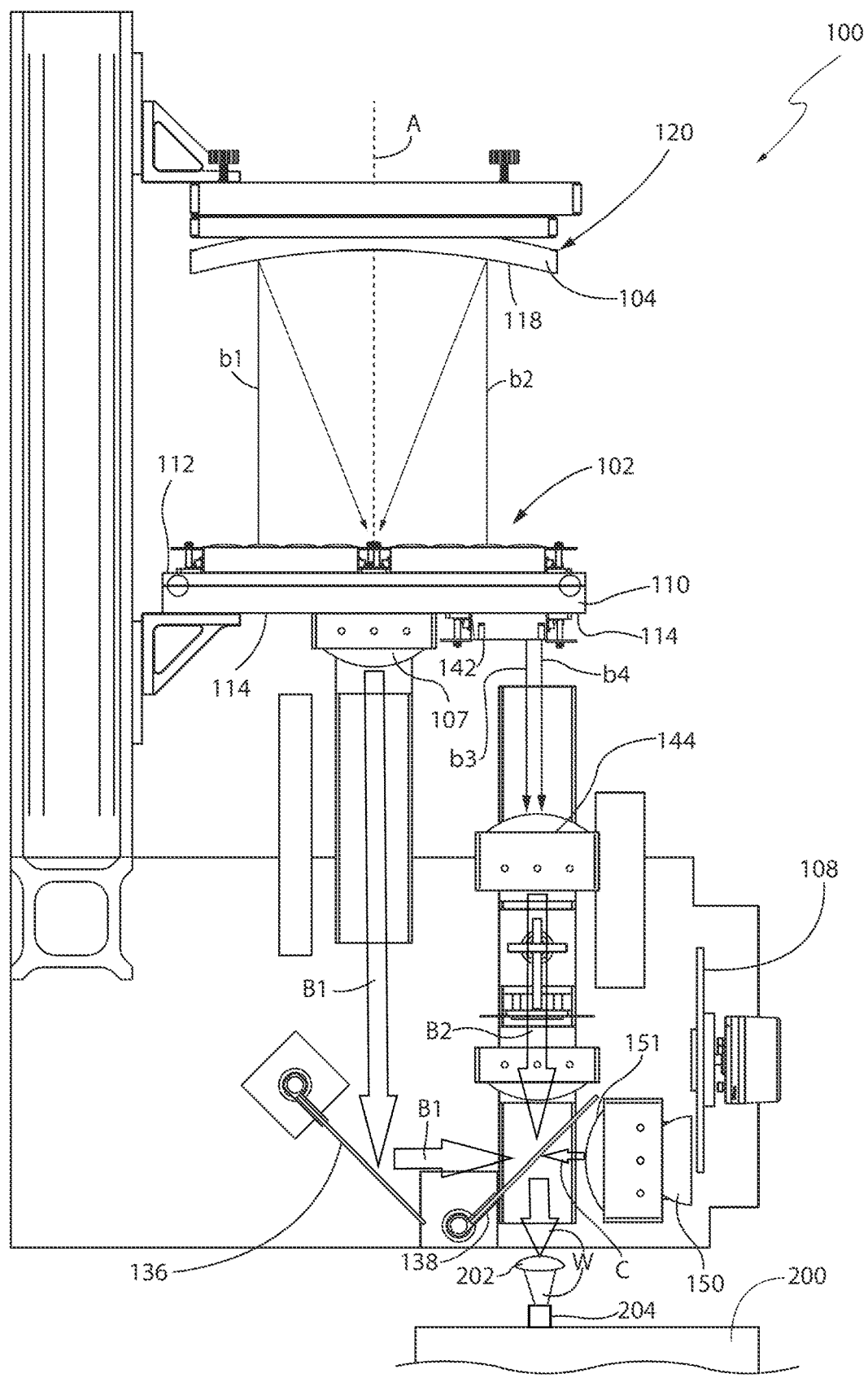
FIG. 7 is a top view of the embodiment shown in FIG. 6.

In some embodiments, as shown in FIGS. 6 and 7, a second plurality of blue laser diodes 142 can be mounted on the second side 114 of the plate 110. This arrangement allows for both sets of blue laser diodes 102, 142 to use a single plate 110 for mounting both sets of laser diodes 102, 142 for compact assembly. The second set of blue laser diodes 142 can be positioned laterally adjacent to the hole 116 so as to emit blue light rays b3, b4 in a direction towards the partially reflective mirror 138 to combine with the broad band light beam C. A second directing lens 144 can be positioned in between the second set of blue laser diodes 142 and the partially reflective mirror 138. The blue light rays b3, b4 pass through the second directing lens 144 and form the second beam of blue light B2 that eventually combines with the broad band light C. In some embodiments, the second directing lens 144 can be a collimating lens.

The second set of blue laser diodes 142 can provide greater controllability of the white point and color coordinates than when the first plurality of blue laser diodes 102 drive both the green-yellow light generation as well as supply the additional blue light channel that is combined with the green-yellow light to produce the white light generation useful for the projector applications. By using a second set of blue laser diodes 142, the user can control the ratio of blue light to the broad band light by controlling the parameters of the blue light, such as the number, intensity, and the like.

With such an embodiment, it is not necessary to have the beam splitter 134 and the second reflector 140 for the second beam of blue light B2 described above. This is because the second plurality of blue laser diodes 142 will generate the second beam of blue light B2 directly and in the proper path. As such, the first plurality of blue laser diodes 102 located on the first side 112 of the plate 110 emits a first set of blue light rays b1, b2 that reflect off of the concave reflector 104 and back towards the hole 116 in the plate 110 where the first set of blue light rays b1, b2 can be collimated or formed into a first beam of blue light B1. The first beam of blue light B1 can be directed towards a reflector 136 without first having to go through a beam splitter 134. From the reflector 136 the first beam of blue light B1 passes through the partially reflective mirror 138 to excite the phosphor region 130 of the phosphor target 108 and generate the broad band light rays c1, c2, some of which are emitted back towards a collection lens 132 to form the broad band light beam C directed towards the partially reflective mirror 138 where it is reflected in a different path towards the projector image device. The second set of blue laser diodes 142 can be positioned so as to emit a second set of blue light rays b3, b4, which passes through a directing lens 144 and forms a second beam of blue light B2 directed towards the partially reflective mirror 138. In some embodiments, the directing lens 144 can be a collimating lens to collimate the blue light rays b3, b4. The second beam of blue light B2 passes through the partially reflective mirror 138 and combines with the broad band light beam C to create the white light W sent through a lens 202 and directed towards the projector imaging device 200. In some embodiments, the projector imaging device 200 can have an integrating rod 204 to receive the white light W focused through lens 202.

In another aspect of the present invention, the capabilities of generating quality white light W can also be improved by increasing the efficiency of capturing the broad band light rays c1, c2 using a reflection system. Since the phosphor region 130 emits broad band light rays c1, c2 scattered in all directions, some of the broad band light rays c2 would miss the collection lens 132 (i.e. enter the non-collectable zone 172) and would otherwise be wasted. As such, in some embodiments, the present invention employs a reflection system that recycles what would otherwise have been wasted light by reflecting and re-reflecting light emitted towards the non-collectable zone 172 back onto the phosphor region 130. Various factors can contribute to the light rays c2 originally directed towards the non-collectable zone 172 to be directed towards the collectable zone 170. For example, due to potential impurities in the phosphor target 108, imperfections on the surface of the phosphor target 108, or inherent characteristics of the phosphor used, the direction of travel of the light rays may be altered in a manner that causes the light ray c2 to enter the collectable zone 170. This may occur upon its first reflection, or a series of reflection causing the light ray c2 to progressively head towards the collectable zone 170. In other words, light rays c2 heading towards a non-collectable zone 172 may hit the reflection system at an angle that directs the light ray c2 to a collection region 162 on the phosphor target 108 causing the light to head directly towards the collectable zone 170 and towards the collection lens 132. This reflection and re-reflection can repeat multiple times until the efficient collection of an increased amount of light is achieved.

With reference to FIG. 5, in some embodiments, the reflection system can comprise a recycling optic 146, a reflective material 148 on the phosphor target 108, or a combination of the recycling optic 146 and the reflective material on the phosphor target. In the preferred embodiment, the phosphor target 108 is a phosphor wheel. The first side 124 is the side of the phosphor target 108 facing the incoming beam of blue light B1. The second side 126, opposite the first side 124, can comprise a reflective material 148 (e.g., reflective coating, reflective mirror, reflective device, etc.). In some embodiments, the reflective material 148 may be a flat reflector. The phosphor region 130 may be excited by the beam of blue light B1, and emit the broad band of light rays c1, c2 in a desired spectrum in all directions. Some of the emitted light rays c1 are directed towards the collectable zone 170 and are collected by a collection lens 132, which then transmits the collective light beam C to the projector system optics.

Most of the emitted light rays c2 are transmitted into a non-collectable zone 172, meaning the light rays c2 are emitted in a direction that cannot be directly captured by the collection lens 132. For example, in some instances, the emitted light rays c2 can be directed towards the second side 126 of the phosphor target 108. Normally, these light rays c2 would be wasted. In some embodiments, however, the second side 126 can comprise a reflective material 148. Now, emitted light rays c2 that are directed towards the second side 126 of the phosphor target 108 are reflected off of the reflective material 148 back towards the first side 124 of the phosphor target, which could include being directed towards the collectable zone 170 and into the collection lens 132. Therefore, a substantial number of the light rays c2 that are originally emitted towards the second side 126 of the phosphor target 108 can be redirected back towards the collection lens 132. In general, the phosphor region 130 can be a strong scatterer of the light, but, with the assistance of the reflective material 148 on the second side 126 of the phosphor target 108, it is possible that a scattering of the light ray by the phosphor region 130 may result in this reflected light, as well, being directed into the collection lens 132.

In some embodiments, light rays c2 emitted toward the non-collectable zone 172 can still be utilized by implementing a recycling optic 146 that can be placed in between the collection lens 132 and the phosphor target 108. The recycling optic 146 can be a dome shaped device having a curved wall 150 converging at a crown 152 and terminating at a base 154 opposite the crown 152. As such, the recycling optic 146 has a concave interior 158 and a convex exterior 160, although the exterior 160 can be other shapes. The base 154 is open and the crown 152 defines a hole 156. The hole 156 of the crown 152 has a diameter that is smaller than the diameter of the opening of the base 154. The concave interior 158 of the recycling optic 146 is reflective. As such, the recycling optic 146 is a curved reflector.

The radius of curvature of the concave interior 158 of the recycling optic 146 can range from approximately 10 mm to approximately 50 mm. Preferably, the radius of curvature of the concave interior 158 ranges from approximately 10 mm to approximately 30 mm. In the preferred embodiment, the radius of curvature of the concave interior 158 is approximately 27 mm.

The interior diameter of the base 154 can range from approximately 10 mm to approximately 80 mm. Preferably, the interior diameter of the base 154 ranges from approximately 15 mm to approximately 60 mm. In the preferred embodiment, the recycling optic 146 has a base 154 with an interior diameter of approximately 52 mm, and an exterior diameter of approximately 60 mm.

The crown 152 is positioned on the side nearer to the collection lens 132 as compared to the base 154. The base 154 is positioned nearer to the phosphor target 108 as compared to the crown 152. As such, the recycling optic 146 is positioned such that the base 154 is adjacent to the phosphor target 108 and the crown 152 is adjacent to the collection lens 132. Based on the configuration of the phosphor target 108, the recycling optic 146 can be positioned over a portion of the phosphor region 130. In embodiments in which the phosphor region 130 is a strip on the first side 124 of the phosphor target 108 along the perimeter 128, the recycling optic 146 would also be positioned at the perimeter 128 of the phosphor target 108. Preferably, the hole 156 is a circular hole defining a center. In the preferred embodiment, the center of the hole 156 in the crown 152 can be aligned with the center of the width of the strip defining the phosphor region 130. Therefore, a portion of the recycling optic 146 may not cover the phosphor target 108.

The recycling optic 146 can be coated so that it reflects light of interest and transmits infrared light (heat). In the case of a spherical recycling optic 146 the preferable position for the recycling optic 146 is so that the center of curvature of the sphere is located at the center of the pump region, which is preferably at the center of the collection region 162 of the phosphor target 108. Therefore, the center of curvature of the recycling optic can extend past the base 154 of the recycling optic by the same distance as the gap 180 between the base of the recycling optic 146 and phosphor target 108. Thus, for example, if the distance of the gap 180 between the base 154 of the recycling optic 146 and the phosphor target 108 is approximately 6 mm, then the center of curvature of the recycling optic can also be 6 mm past the base 154. Situating the recycling optic 146 so that the center of the collection region 162 (i.e. the phosphor pump spot illuminated by the laser) is located at the center of curvature of the recycling optic 146, will cause the reflection from the recycling optic 146 to create an inverted image of the spot at the same location. At this position an inverted image of the pump spot emission will be projected back onto the pump spot with a magnification of 1. This is the only position of the recycling optic 146 with respect to the phosphor that will produce a focused image of the spot back onto the phosphor wheel. At this imaging position, only light being emitted from the collection region 162 can be reflected back to the collection region 162.

Preferably, the pump region is the same size as the collection region 162. In some embodiments, the pump region is smaller than the collection region.

The hole 156 at the crown 152 can have a diameter ranging from approximately 5 mm to approximately 50 mm. Preferably, the diameter of the hole 156 at the crown 152 ranges from approximately 10 mm to approximately 40 mm. In the preferred embodiment, the diameter of the hole 156 at the crown 152 is approximately 36 mm.

There is a gap 180 between the base 154 of the recycling optic 146 and the first side 124 of the phosphor target 108 that ranges from approximately 0.5 mm to approximately 15 mm. Preferably, the gap 180 between the base 154 of the recycling optic 146 and the first side 124 of the phosphor target 108 ranges from approximately 1 mm to approximately 8 mm. In the preferred embodiment, the gap 180 between the base 154 of the recycling optic 146 and the first side 124 of the phosphor target 108 is approximately 6 mm.

The collection lens 132 can have a base side 133, which is the portion of the lens positioned closest to the recycling optic 146. The distance 135 from the base side 133 of the collection lens 132 to the hole 156 at the crown 152 (i.e. from the portion of the crown defining the hole 156) can be approximately 1 mm to approximately 20 mm. Preferably, the distance 135 from the base side 133 of the collection lens 132 to the hole 156 at the crown 152 can be approximately 1 mm to approximately 5 mm. More preferably, the distance 135 from the base side 133 of the collection lens 132 to the portion of the crown 152 defining the hole 156 is approximately 1.5 mm.

In some embodiments, the collection lens 132 can be a spherical lens. In some embodiments, the collection lens 132 can be an aspherical lens. A distance from the base side 133 of the collection lens 132 to the first side 124 of the phosphor target 108 can be approximately 10 mm to approximately 40 mm. Preferably, the distance from the base 133 of the collection lens 132 to the first side 124 of the phosphor target ranges from approximately 10 mm to approximately 30 mm. In the preferred embodiment, the distance from the base 133 of the collection lens 132 to the first side 124 of the phosphor target is approximately 21 mm. Due to the use of the recycling optic 146, the collection lens 132 can be placed further away from the phosphor target 108 while still maintaining efficiency. Without the recycling optic, a system would have to have a collection lens with a very high numerical aperture placed within only a few millimeters from the phosphor target 108. For example, without the recycling optic 146, the numerical aperture can be approximately 0.707. With the recycling optic 146, the numerical aperture can be 0.98. In order to obtain a numerical aperture of approximately 0.93, other devices would have to place the base of the collection lens approximately 2.3 mm from the phosphor target.

In some embodiments, the system 100 may comprise both the recycling optic 146 and the reflective material 148 on the second side 126 of the phosphor target 108. With this configuration, the blue light rays b1, b2 emitted from the first set of laser diodes 102 are directed towards a first path towards the concave reflector 104, reflect off the concave reflector 104 and head towards the hole 116 in the plate 110, where the blue light rays b1, b2 can be collimated into a beam of blue light B. The beam of blue light B then follows a path towards the phosphor target 108. The beam of blue light B enters the hole 156 in the recycling optic 146 and hits the phosphor region 130. The phosphor region 130 emits broad band light rays c1, c2 in all directions. Broad band light rays c2 heading toward the second side 126 of the phosphor target 108 are reflected off of the reflective material 148 on the second side 126 of the phosphor target 108 and reflect back toward the collectable zone and into the collection lens 132 or the recycling optic 146. Light rays c1 that enter the collection lens 132 can be collimated and used to generate white light W. Light rays c2 that hit the recycling optic 146 can reflect back toward the phosphor target 108 where they might reflect off the reflective material 148 again and re-reflect back towards the collection lens 132 or the recycling optic 146. This ongoing process of reflection and re-reflection of light rays c2 heading towards the non-collectable zone 172 eventually results in most of the emitted light rays c1, c2 entering the collectable zone 170, thereby allowing the collection lens 132 to collect most of the broad band light rays c1, c2 emitted from the phosphor target 108. As such, due to the arrangement of the reflective material 148 and the recycling optic 146, most of the light rays emitted from the phosphor target 108 will eventually be captured by the collection lens 132 either through a direct emission towards the collection lens 132 or after having been reflected around within the reflection system one or more times.

The collection lens 132 directly collects light emitted by a certain region of the phosphor region 130 (called the collection region 162). Light emitted outside of this collection region 162 may strike the lens 132 but will not be focused into a useful area of the projector collection optics (that is, it does not fall within or match the e-tendue of the system). Some of the light outside of this collection region 162 may be reflected off of the recycling optic 146 and into the collection region 162 of the phosphor region 130, where it has a chance of being scattered into the lens 132 and contribute as useful light.

In some embodiments, the recycling optic 146 is spherical in shape, and the center of the spherical region formed by the recycling optic 146 may be located near the first side 124 of the phosphor target 108 and in the center of the collection region 130 (although optimal positioning could differ from this slightly, such as positioning the center of the spherical region further into the phosphor layer(s)). In this manner, light emitted by the phosphor from the collection region 162 that strikes the recycling optic 146 may be reflected back to the phosphor at a location in the collection region 162.

Some embodiments of the present invention may use a shape for the recycling optic 146 that is non-spherical, such as parabolic or hyperbolic, or other such corrective shape to optimize the amount of light that both is directed to the collection lens 132 and at a sufficient angle to contribute as useful light once it has passed through the lens. For example, a recycling optic 146 with a parabolic shape can be positioned such that the focal point of the parabola is positioned on the collection region 162.

Use of the system described in the present invention shows that system performance may be increased by over 60% with the recycling optic 146 and reflective material 148 in place. In some embodiments, use of the recycling optic 146 and reflective material 148 allow the system to capture approximately 60% to approximately 70% of the light emitted from the phosphor target 108.

With reference to FIGS. 6 and 7, in some embodiments, the phosphor target can be optional for the generation of white light W. For example, the first side 112 of the plate 110 may have a first set of laser diodes 102 emitting blue light, a second set of laser diodes 103, 105 emitting a different color light. The different color can be red light, green light, or both red light and green light. These light rays can be directed towards the concave reflector 104. Light rays that are parallel to the axis A of the concave reflector 104 are then reflected back towards the focal point F of the concave reflector 104 where the light rays combine into white light. The white light W is then focused through the hole 116 in the center of the plate 110 into a series of optical devices through which the light can be collimated into a beam of parallel light rays for use in the balance of the projection system. Various adjustments may have to be made to accommodate the multiple colors. For example, the beam splitter 134 can be configured to split the beam of red light and/or the beam of green light as described for the beam of blue light. The partially reflective mirror 138 can be configured to allow red light and/or green light to pass through.

Alternatively, the white light W can be focused onto optical fibers that are coupled together into a single beam or an integrating rod 204 for the projector. This method additionally has the advantage of alignment of the fiber optics components to receive the light emitted from the laser diodes that is easier than previous configurations.

Alternatively, the set of diodes 142 on the second side of the plate 110 can comprise diodes that emit blue light rays, red light rays, or green light rays, or any combination thereof. Thus, any combination of the number and intensity of blue, red, and green light rays emitted from the first set of diodes 102 on the first side 112 of the plate 110 can be combined any combination of the number and intensity of blue, red, and green light rays emitted from the set of diodes 142 on the second side 114 of the plate 110 to create the optimal white light desired. In this configuration, the laser diodes 102, 103, 105, 142 can be controlled in terms of the number of diodes turned on or the intensity of each diode to fine to the quality of white light generated.

To further increase versatility and options, the use of laser diodes on the front side 112 of the plate 110 and the back side 114 of the plate 110 with the various combination of colors can be implemented with the emission of broad band light from the phosphor target 108 to generate the white light W as described above.

While the present invention has been described with regards to particular embodiments, additional variations of the present invention may be devised without departing from the inventive concept. These and other advantageous aspects of the invention will be apparent to those skilled in the art from the description herein.

What is claimed is:

1. A system for generating white light in a laser phosphor projector, the system comprising:
   a) a plate having a first side, a second side opposite the first side, and a hole therethrough;
   b) a first plurality of laser diodes arranged on the first side of the plate, the plurality of laser diodes configured to emit blue light rays;
   c) a concave reflector having a focal point, the concave reflector positioned to receive the blue light rays emitted from the first plurality of laser diodes and reflect the blue light rays toward the focal point; and
   d) a rotatable phosphor wheel having a phosphor region, the phosphor region comprising cerium-doped yttrium aluminum garnet (YAG) to receive the blue light ray and emit broad band light rays with a peak in a yellow-green range, wherein when the phosphor region is hit with the blue light rays, the broad band light rays are emitted;
   e) a collection lens to collect the broad band light rays; and
   f) optical devices to direct the broad band light rays with a second set of blue light rays to create white light.

2. The system of claim 1, further comprising a second plurality of laser diodes mounted on the first side of the plate to generate a second color of lights to reflect off of the concave reflector and through the hole of the plate, the second color of lights having at least one color selected from the group consisting of red and green.

3. A laser phosphor projection system, comprising:
   a) a plate having a first side, a second side opposite the first side, and a hole therethrough;
   b) a first plurality of laser diodes arranged on the first side of the plate to generate a first set of blue light rays;
   c) a concave reflector having a focal point, the concave reflector positioned to receive the first set of blue light rays emitted from the first plurality of laser diodes and reflect the first set of blue light rays towards the focal point;
   d) a rotatable phosphor wheel having a phosphor region comprising cerium-doped yttrium aluminum garnet (YAG) to receive the first set of blue light rays and emit broad band light rays with a peak in a yellow-green range, wherein when the phosphor region is hit with the first set of blue light rays, the broad band light rays are emitted;
   e) an optical device to direct the broad band light rays towards a second set of blue light rays to create white light.

4. The system of claim 3, further comprising a second plurality of laser diodes mounted on the second side of the plate to emit a second set of blue light rays.

5. The system of claim 3, further comprising a third plurality of laser diodes arranged on the second side of the plate to generate a second color of lights, the second color of lights having at least one color selected from the group consisting of red and green.

6. A laser phosphor projection system, comprising:
   a) a plate having a first side, a second side opposite the first side, and a hole therethrough;
   b) a first plurality of laser diodes arranged on the first side of the plate to generate a first set of blue light rays;
   c) a concave reflector having a focal point, the concave reflector positioned to receive the first set of blue light rays emitted from the first plurality of laser diodes and reflect the first set of blue light rays toward the focal point, wherein the focal point is at the hole of the plate;
   d) a directing lens located at the hole of the plate through which the first set of blue light rays reflected off of the concave reflector passes to direct the first set of blue light rays as a first beam of blue light;
   e) a phosphor target having a first side and a second side, wherein the phosphor target is positioned to receive the first beam of blue light and emit broad band light rays;
   f) a collection lens to collect the broad band light rays and direct the collected broad band light rays as a beam of broad band light; and
   g) an optical device positioned to reflect the beam of broad band light to into a projector imaging device.

7. The laser phosphor projection system of claim 6, wherein when the phosphor target is hit with the first beam of blue light, the broad band light rays are emitted and scattered towards a collectable zone and a non-collectable zone.

8. The laser phosphor projection system of claim 7, wherein the phosphor target comprises a reflective material on the second side of the phosphor target to reflect the broad band light rays emitted towards the non-collectable zone behind the rotatable phosphor wheel.

9. The laser phosphor projection system of claim 8, further comprising a recycling optic positioned to receive the broad band light rays in the non-collectable zone in front of the rotatable phosphor wheel to reflect the broad band light rays in the non-collectable zone back towards the phosphor wheel to reflect off the reflective material and enter the collectable zone or the non-collectable zone.

10. The laser phosphor projection system of claim 6, wherein the phosphor target has a phosphor region on the first side of the of the phosphor target along the perimeter.

11. The laser phosphor projection system of claim 6, further comprising a second plurality of laser diodes mounted on the second side of the plate to emit a second set of blue light rays to combine with the beam of broad band light.

12. The laser phosphor projection system of claim 11, further comprising a third plurality of laser diodes mounted on the second side of the plate to emit a set of red light rays to combine with the beam of broad band light.

13. The laser phosphor projection system of claim 11, further comprising a third plurality of laser diodes mounted on the second side of the plate to emit a set of green light rays to combine with the beam of broad band light.

14. The laser phosphor projection system of claim 6, further comprising a first reflective mirror positioned in the path of the first beam of blue light in between the directing lens and the phosphor target to reflect the first beam of blue light from the directing lens to the phosphor target.

15. The laser phosphor projection system of claim 14, further comprising a beam splitter in the path of the first beam of blue light in between the directing lens and the first reflective mirror to generate a second beam of blue light in a direction perpendicular to the first beam of blue light, and allow a portion of the first beam of blue light to pass through the beam splitter towards the first reflective mirror.

16. The laser phosphor projection system of claim 15, further comprising a second reflective mirror positioned in a first path of the second beam of blue light to reflect the second beam of blue light into a second path in a direction perpendicular to the first path of the second beam of blue light to combine the second beam of blue light with the beam of broad band light.

17. The laser phosphor projection system of claim 15, a second plurality of laser diodes mounted on the first side of the plate to generate a set of red light rays to reflect off of the concave reflector, through the hole of the plate, and through the directing lens to direct the set of red light rays as a beam of red light.

18. The laser phosphor projection system of claim 17, wherein the beam splitter is configured to reflect the beam of red light towards the second reflective mirror to combine the beam of red light with the beam of broad band light.

19. The laser phosphor projection system of claim 15, a second plurality of laser diodes mounted on the first side of the plate to generate a set of green light rays to reflect off of the concave reflector and through the hole of the plate and through the directing lens to direct the set of green light rays as a beam of green light.

20. The laser phosphor projection system of claim 19, wherein the beam splitter is configured to reflect the beam of green light towards the second reflective mirror to combine the beam of green light with the beam of broad band light.

* * * * *